(12) United States Patent
Haimer et al.

(10) Patent No.: US 10,022,807 B2
(45) Date of Patent: Jul. 17, 2018

(54) BALANCING ADAPTER

(71) Applicant: Haimer GmbH, Igenhausen (DE)

(72) Inventors: Franz Haimer, Igenhausen (DE); Lothar Kirmayer, Adelkofen (DE)

(73) Assignee: HAIMER GMBH, Hollenbach (DE)

( * ) Notice: Subject to any disclaimer, the term of this patent is extended or adjusted under 35 U.S.C. 154(b) by 292 days.

(21) Appl. No.: 14/397,778

(22) PCT Filed: Apr. 26, 2013

(86) PCT No.: PCT/EP2013/058758
§ 371 (c)(1),
(2) Date: Oct. 29, 2014

(87) PCT Pub. No.: WO2013/164270
PCT Pub. Date: Nov. 7, 2013

(65) Prior Publication Data
US 2015/0123356 A1  May 7, 2015

(30) Foreign Application Priority Data
Apr. 30, 2012 (DE) .................... 20 2012 101 591 U

(51) Int. Cl.
B23B 31/26 (2006.01)
B23B 31/00 (2006.01)

(52) U.S. Cl.
CPC .......... B23B 31/265 (2013.01); B23B 31/003 (2013.01); *B23B 2231/20* (2013.01); *Y10T 279/17316* (2015.01)

(58) Field of Classification Search
CPC . B23B 31/265; B23B 31/003; B23B 2231/20; Y10T 279/17316
See application file for complete search history.

(56) References Cited

U.S. PATENT DOCUMENTS 4,986,704 A    1/1991  Narushima et al.
6,612,791 B1   9/2003  Haimer
(Continued)

FOREIGN PATENT DOCUMENTS

DE    3506901         8/1986
DE    3838959 A1      6/1989
(Continued)

OTHER PUBLICATIONS

Result of search report for PCT/EP2013/058758 filed Apr. 30, 2012.
(Continued)

*Primary Examiner* — Daniel Howell
*Assistant Examiner* — Paul M Janeski
(74) *Attorney, Agent, or Firm* — Paul D. Bianco; Katharine Davis; Fleit Gibbons Gutman Bongini & Bianco PL

(57) ABSTRACT

A balancing adapter for clamping a rotor to a machine part of balancing machine that rotates about an axis of rotation. The balancing adapter has a main body having a central accommodating opening for the rotor, a collet chuck having clamping elements for detachably retaining the rotor in the accommodating opening, and an actuating device for moving the clamping elements between a clamping position and a releasing position. In order to enable positionally accurate and reproducible accommodation and retention, the clamping elements of the collet chuck are supported on a guiding surface on the main body.

18 Claims, 1 Drawing Sheet

(56) References Cited

U.S. PATENT DOCUMENTS

| | | |
|---|---|---|
| 8,651,498 B2 | 2/2014 | Timtner et al. |
| 2010/0109261 A1 | 5/2010 | Timtner et al. |

FOREIGN PATENT DOCUMENTS

| | | |
|---|---|---|
| DE | 4037745 | 6/1991 |
| DE | 4201013 | 7/1993 |
| DE | 19920264 | 11/2000 |
| DE | 29980181 | 9/2001 |
| DE | 102008054140 | 5/2010 |
| FR | 2608956 | 7/1988 |
| JP | S58160037 | 9/1983 |

OTHER PUBLICATIONS

International Search Report dated Aug. 7, 2013 for PCT/EP2013/058758.
English translation of Written Opinion and International Preliminary Report on Patentability for PCT/EP2013/058758, dated Nov. 4, 2014.
Result of search report for DE 20 2012 101 591.9 filed Apr. 30, 2012.

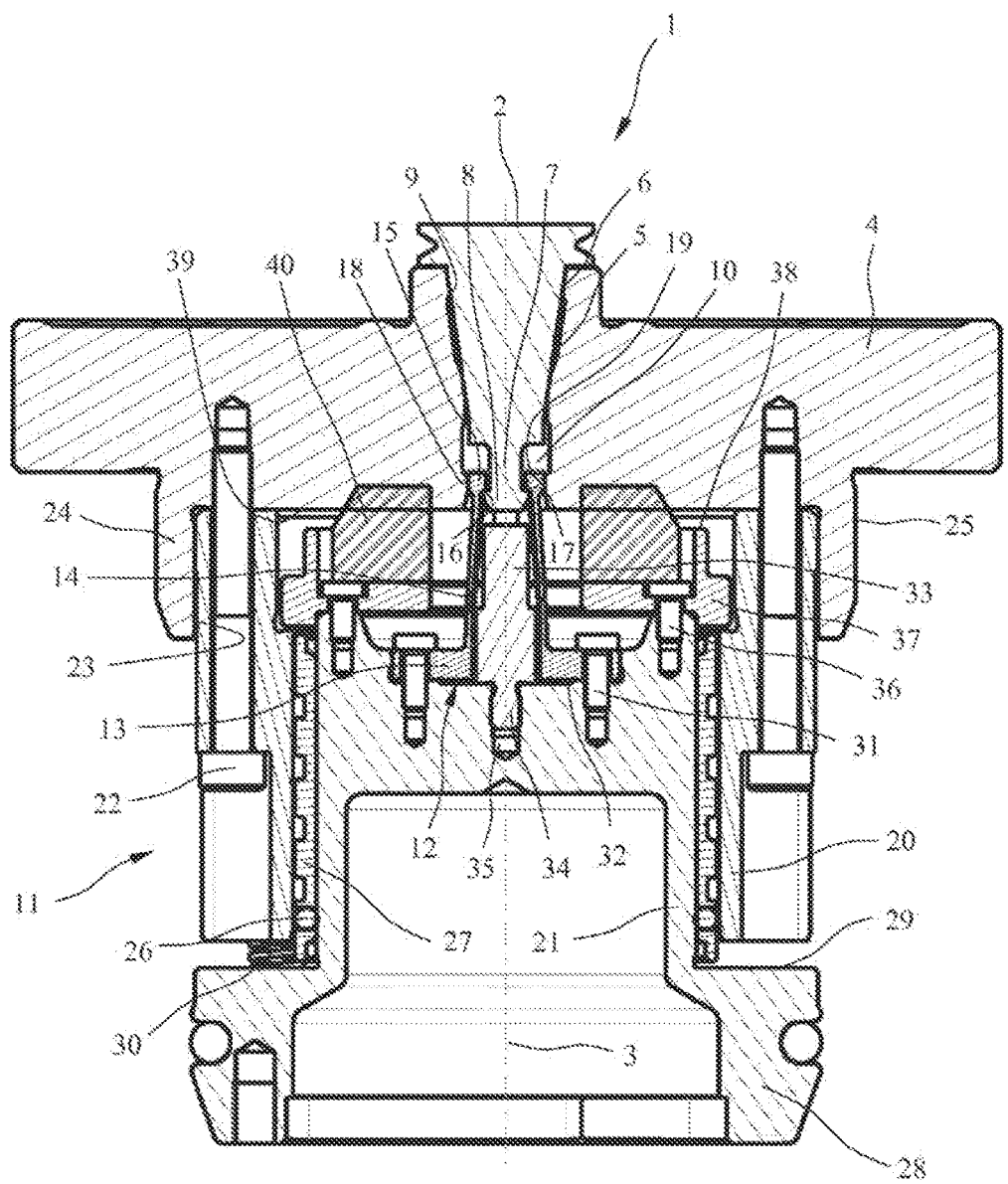

BALANCING ADAPTER

FIELD OF THE INVENTION

The invention concerns an adapter.

BACKGROUND OF THE INVENTION

From DE 299 80 181 U1, an adapting machine with a clamping device for the clamping of a rotating machine element is known. The clamping device contains a main body with a centric retaining opening for the machine element and a chuck actuating unit for a collet chuck, which can be adjusted axially relative to the main body. In this known clamping device of a balancing machine, the machine element is held by claw-shaped clamping elements on the collet chuck in the tool holder. For the clamping, the clamping elements of the collet chuck are supported on a bearing surface of an actuating head of a chuck actuating unit. The chuck actuating unit is supported in a main part body by means of a rolling contact bearing, and the main part body is, in turn, screwed to the main body. By means of such a connection and the many connection sites between the bearing surface for the clamping elements and the main body, however, problems with the centering may arise, which can have a negative effect on the concentricity of the tool holder.

SUMMARY OF THE INVENTION

One embodiment of the invention is a balancing adapter that makes possible a positionally accurate and reproducible accommodation and retention of a rotor or another balancing machine element.

Appropriate refinements and advantageous embodiments of the invention are also disclosed.

In the balancing adapter in accordance with the invention, the clamping elements of the collet chuck are supported on a guiding surface on the main body. In this way, a high accuracy of the positioning of the clamping elements is attained relative to the fitting surface of the main body. The clamping heads are symmetrically positioned relative to the machine element, so the clamping also takes place symmetrically. Thus, there are also no radial forces, which could have a negative effect on the repetitive accuracy of the clamping. No additional guiding parts for the clamping elements are necessary, wherein the number of the parts and the manufacturing or installation expense can be reduced. Due to a lower weight of the rotating masses, the measurement accuracy can be increased and the measurement result can be improved.

In an advantageous embodiment, the actuating device comprises a piston that can be displaced axially within a guiding sleeve. The piston can be actuated, for example, pneumatically, hydraulically, or in some other suitable manner. The collet chuck, however, can be actuated by another drive.

In a favorable embodiment, the collet chuck is firmly connected with the piston. With previous embodiments, this was not possible because the collet chucks had to remain movable in order to compensate for the inaccuracies of the components. Due to a firm connection of the collet chuck with the piston, the number of the parts that are movable relative to one another is reduced, and thus a higher measurement and repetitive accuracy is attained.

In another advantageous embodiment, an attenuating element is located between the piston and the main body. To loosen the rotor, the actuating device is run into the main body. There is the danger thereby that the impact produced not only loosens the rotor, in particular one with a small design, but rather completely expels it from the retaining opening. With an attenuating element, which can be made, for example, of sponge rubber, this negative effect is circumvented.

The piston can have a stop part with a stop surface for placement on a stop surface of the main body. In view of the fact that the stop surfaces are formed close to the main body or are formed by the main body itself, only a few manufacturing tolerances influence the position of the stop surfaces, so that in spite of the high demand on the accuracy, one can do without an additional adjustment mechanism of the stops.

In another advantageous embodiment, an ejector to expel the rotor is provided within the collet chuck so as to expel it within the release stroke. The ejector is preferably designed as an integral part with the piston or is affixed, via a threaded pin, in a pocket hole of the piston. Since the piston is moved, for example, by a pressure medium, the sealing of the piston is extremely important. A pocket hole has the advantage that the piston is not breached by the holder of the ejector and thus no other sealing measures are needed.

In another advantageous development, an inner, cylindrical guiding surface for the guiding sleeve is located in a cylindrical heel of the main body, and a centering surface for the retention in a corresponding centering holder of the rotating machine part is located on the outside of the cylindrical heel. In this way, the guiding or centering surfaces of the main body used for the centering even overlap axially, wherein a compact design and a low weight are possible.

In order to reduce friction during the movement of the piston and to center the piston free of play and with low pretension, it can be stored in the guiding socket, via a storage socket provided with rolling elements.

BRIEF DESCRIPTION OF THE DRAWINGS

Other features and advantages of the invention can be deduced from the following description of a preferred embodiment example with the aid of the single FIG. 1, which shows a balancing adapter in accordance with the invention in a longitudinal section.

DETAILED DESCRIPTION OF THE INVENTION

The balancing adapter 1, shown in FIG. 1, is intended to clamp a rotor 2 on a machine part of a balancing machine, which rotates about an axis of rotation 3. The balancing adapter 1 contains a main body 4, which can be affixed, for example, on a machine spindle of a balancing machine and which has a retaining opening 5 for a coupling shaft 6 of the rotor 2, which is centric relative to the rotational axis 3. The rotor can be, for example, for a drilling, milling, or grinding tool or another balancing machine part. In the embodiment shown, the rotor 2 contains a cone-shaped coupling shaft 6 and a lower cylindrical clamping pin 7 with an enlarged clamping head 8. The retaining opening 5 of the main body 4 has an upper conical fitting surface 9 for the cone-shaped coupling shaft 6 and a lower area 10 for holding the clamping pin 7 with the enlarged clamping head 8.

An actuating device 11 for a collet chuck 12 is located on the underside of the main body 4. The collet chuck 12 has an annular socket 13 and several radially elastic tongues 14, separated from one another by axial slits in the circumferential direction, with claw-shaped clamping elements 15 on the free ends of the tongues 14 for the detachable retaining of the rotor 2 in the retaining opening 5 of the main body 4. The claw-shaped clamping elements 15 are designed for the introduction and holding of the clamping pin 7 and have a radial, inner clamping surface 16, at an incline, for placement on an upper opposite surface 17 on the clamping head 8. Via another surface 18, the clamping elements 15 are directly supported on the main body 4 on a corresponding guiding surface 19 in the lower area 10 of the retaining opening 5 of the main body 4.

The actuating device 11 comprises a piston 21, which can be displaced axially within a guiding sleeve 20, on whose upper side the collet chuck 12 is mounted. The guiding sleeve 20 is affixed via screws 22 on the underside of the main body 4. For the exact guidance and the exact alignment of the guiding sleeve 20 relative to the main body 4, the main body 4 has an inner cylindrical guiding surface 23 in lower cylindrical heel 24. The cylindrical heel 24 contains a centering surface 25 on its outer side for the purpose of retention in a corresponding centering retention of the rotating machine part. The piston 21 is guided in an axially displaceable manner within the guiding sleeve 20, via a storage socket 27 provided with rolling elements 26. The piston 21 has a lower pipe coil 28 with an upper annular stop surface 29. A pressure spring 30 is clamped between the annular stop surface 29 of the piston 21 and the guiding sleeve 20.

The collet chuck 12 is affixed to the upper front side of the piston 21 via the annular socket 13, with the aid of screws 31 and in a corresponding indentation 32. There is a rod-shaped ejector 33 within the collet chuck 12; it is affixed, via a threaded pin 34, in a pocket hole 35 on the upper front side of the piston 21. Furthermore, an annular stop part 37 with an upper stop surface 38 is affixed on the upper front side of the piston 21 with the aid of screws 36, for placement on a lower stop surface 39 of the main body 4. An attenuator 40 is provided between the annular stop part 37 and the main body 4.

FIG. 1 shows the balancing adapter 1 when clamped. The piston 21 is pressed downward by the pressure spring 30, wherein the claw-shaped clamping elements 15 of the collet chuck 12, affixed to the piston 21, are pressed radially inward into a clamping position via the guiding surface 19 on the main body 4, and the rotor 2 is introduced axially and held via the clamping surfaces 16 of the clamping elements 15, adjacent to the opposite surfaces 17 of the clamping head 8.

If the piston 21 is displaced upward, for example, pneumatically, against the force of the pressure spring 30, the clamping elements 15 arrive in an expanded part of the lower area 10 of the retaining opening 5, so that the clamping elements 15 can move radially outward into a release position and the clamping head 8 can be released for the removal of the rotor 2. In the upward displacement of the piston 21, the rod-shaped ejector 33 for the placement also arrives at the lower front surface of the clamping head 8, wherein the rotor 2 is expelled via the ejector 33. The clamping stroke of the piston 21 is limited by the stop of the annular stop part 37 on a stage of the guiding sleeve 20. The release stroke is limited by the stop of the upper stop surface 38 of the annular stop part 37 on a lower stop surface 39 of the main body 4.

The release process can take place quickly and without any great time loss. In the end phase of the release stroke, the rotor 2 is actively expelled so far from the main body 4 with the ejector 33 that it is loosened and can be removed by hand. The impact during the release process can be decelerated by the attenuator, made, for example, of sponge rubber and located between the annular stop part 37 and the main body 4. In this way, particularly with small rotors 2, the main body is prevented from being completely ejected.

The invention claimed is:

1. A balancing adapter for clamping a rotor on a machine part of a balancing machine rotatable about an axis of rotation, the balancing adapter comprising:

a main body having a centric opening for receiving the rotor, the main body having an inner, cylindrical surface;

a guiding sleeve for a guiding a piston affixed to the main body, the guiding sleeve contacting the inner, cylindrical surface to align with the main body;

a collet chuck having clamping elements for detachably receiving the rotor in the centric opening;

guiding surfaces within a lower portion of the centric opening of the main body, the guiding surfaces configured for supporting the clamping elements of the collet chuck;

an actuating device for moving the clamping elements between a clamping position and a release position; the actuating device including a piston axially displaceable within the guiding sleeve;

a storage socket including a plurality of rolling elements, the storage socket positioned between the guiding sleeve and the piston for centering the piston within the guiding sleeve;

an annular stop part affixed on an upper portion of the piston;

an attenuating element positioned between the annular stop part and the main body, the attenuating element configured for decelerating impact between the annular stop part and the main body when the clamping elements are moved from the clamping position into the release position; and an annular socket connecting the collet chuck with the piston such that the collet chuck moves axially with the piston.

2. The balancing adapter according to claim 1, wherein the annular stop part comprises a lower stop surface configured for contacting a surface of the guiding sleeve to limit displacement of the piston when the clamping elements are moved from the release position into the clamping position.

3. The balancing adapter according to claim 1, wherein the annular stop part comprises an upper stop surface configured for contacting a surface of the main body to limit displacement of the piston when the clamping elements are moved from the clamping position into the release position.

4. The balancing adapter according to claim 1, further comprising an ejector positioned within the collet chuck and affixed to the piston, the ejector configured for expelling the rotor from the concentric opening in the main body when the clamping elements are moved from the clamping position into the release position.

5. The balancing adapter according to claim 4, wherein the ejector comprises a threaded pin for engaging a pocket indentation in the piston and affixing the ejector to the piston.

6. The balancing adapter according to claim 1, wherein the inner, cylindrical surface is located within a cylindrical heel portion of the main body.

7. The balancing adapter according to claim 6, wherein the cylindrical heel portion has a centering surface on an outer surface, the centering surface configured for centering the machine part.

8. The balancing adapter according to claim 1, further comprising screws affixing the annular socket within an indentation in the piston.

9. The balancing adapter according to claim 1, wherein the collet chuck includes a plurality of spaced-apart, radially-extending tongues, each tongue of the plurality of spaced-apart, radially-extending tongues having a free end.

10. The balancing adapter according to claim 9, wherein the clamping elements are positioned at the free ends of the tongues.

11. The balancing adapter according to claim 1, wherein the attenuating element is composed of a rubber material.

12. The balancing adapter according to claim 1, further comprising screws affixing the annular stop part to the upper portion of the piston.

13. The balancing adapter according to claim 1, further comprising screws affixing the guiding sleeve to an underside of the main body.

14. The balancing adapter according to claim 1, wherein the main body is affixed to a spindle of the balancing machine.

15. A balancing machine comprising:
a spindle;
a rotor; and
a balancing adapter for clamping the rotor, wherein the balancing adapter includes;
a main body having a centric opening for receiving the rotor, the main body having an inner, cylindrical surface;
a guiding sleeve for a guiding a piston affixed to the main body, the guiding sleeve contacting the inner, cylindrical surface to align with the main body;
a collet chuck having clamping elements for detachably receiving the rotor in the centric opening;
guiding surfaces within a lower portion of the centric opening of the main body, the guiding surfaces configured for supporting the clamping elements of the collet chuck;
an actuating device for moving the clamping elements between a clamping position and a release position; the actuating device including a piston axially displaceable within the guiding sleeve;
a storage socket including a plurality of rolling elements, the storage socket positioned between the guiding sleeve and the piston for centering the piston within the guiding sleeve;
an annular stop part affixed on an upper portion of the piston;
an attenuating element positioned between the annular stop part and the main body, the attenuating element configured for decelerating impact between the annular stop part and the main body when the clamping elements are moved from the clamping position into the release position; and
an annular socket connecting the collet chuck with the piston such that the collet chuck moves axially with the piston.

16. The balancing machine according to claim 15, wherein the collet chuck of the balancing adapter further comprises a plurality of spaced-apart, radially-extending tongues, each tongue of the plurality of spaced-apart, radially-extending tongues having a free end.

17. The balancing machine according to claim 16, wherein the clamping elements of the collet chuck are positioned at the free ends of the tongues.

18. A balancing adapter for clamping a rotor on a machine part of a balancing machine rotatable about an axis of rotation, the balancing adapter comprising:
a main body having a centric opening for receiving the rotor, the main body having an inner, cylindrical surface;
a guiding sleeve for a guiding a piston affixed to the main body, the guiding sleeve contacting the inner, cylindrical surface to align with the main body;
a collet chuck having clamping elements for detachably receiving the rotor in the centric opening;
guiding surfaces within a lower portion of the centric opening of the main body, the guiding surfaces configured for supporting the clamping elements of the collet chuck;
an actuating device for moving the clamping elements between a clamping position and a release position; the actuating device including a piston axially displaceable within the guiding sleeve;
a storage socket including a plurality of rolling elements, the storage socket positioned between the guiding sleeve and the piston for centering the piston within the guiding sleeve;
an annular stop part affixed on an upper portion of the piston;
a lower stop surface on the annular stop part, the lower stop surface configured for contacting a surface of the guiding sleeve to limit displacement of the piston when the clamping elements are moved from the release position into the clamping position;
an upper stop surface on the annular stop part, the upper stop surface configured for contacting a surface of the main body to limit displacement of the piston when the clamping elements are moved from the clamping position into the release position;
an attenuating element positioned between the annular stop part and the main body, the attenuating element configured for decelerating impact between the annular stop part and the main body when the clamping elements are moved from the clamping position into the release position; and
an annular socket connecting the collet chuck with the piston such that the collet chuck moves axially with the piston.

* * * * *